United States Patent [19]
DeColibus

[11] Patent Number: 5,886,129
[45] Date of Patent: Mar. 23, 1999

[54] OXIDATIVELY STABLE RIGID AROMATIC POLYIMIDE COMPOSITIONS AND PROCESS FOR THEIR PREPARATION

[75] Inventor: Raymond Lew DeColibus, Circleville, Ohio

[73] Assignee: E. I. du Pont de Nemours and Company, Wilmington, Del.

[21] Appl. No.: 886,233

[22] Filed: Jul. 1, 1997

[51] Int. Cl.⁶ ............................. C08G 69/26; C08G 73/10
[52] U.S. Cl. ......................... 528/170; 528/125; 528/128; 528/172; 528/173; 528/176; 528/183; 528/220; 528/229; 528/350; 528/353
[58] Field of Search ..................... 528/353, 125, 528/128, 170, 172, 173, 176, 183, 220, 229, 350

[56] References Cited

U.S. PATENT DOCUMENTS

| | | | |
|---|---|---|---|
| 3,179,614 | 4/1965 | Edwards | 260/30.2 |
| 3,179,631 | 4/1965 | Endrey | 260/78 |
| 3,249,588 | 5/1966 | Gall | 260/47 |
| 4,622,384 | 11/1986 | Manwiller | 528/353 |
| 4,623,563 | 11/1986 | Noda et al. | 427/379 |
| 4,731,287 | 3/1988 | Noda et al. | 428/332 |
| 4,755,555 | 7/1988 | Manwiller et al. | 524/607 |
| 4,839,217 | 6/1989 | Tabata et al. | 428/156 |
| 5,162,492 | 11/1992 | Kaku | 528/353 |
| 5,243,024 | 9/1993 | Bockrath et al. | 528/353 |
| 5,461,137 | 10/1995 | Serafini et al. | 528/353 |
| 5,461,138 | 10/1995 | Serafini et al. | 528/353 |

*Primary Examiner*—P. Hampton-Hightower
*Attorney, Agent, or Firm*—Inna Y. Belopolsky

[57] ABSTRACT

A rigid, aromatic polyimide composition prepared using a solution imidization process from an aromatic tetracarboxylic dianhydride and a diamine which is greater than 60 mole % to about 85 mole % p-phenylene diamine and 15 mole % to less than 40 mole % m-phenylene diamine exhibits exceptional tensile properties and thermal oxidative stability.

9 Claims, 1 Drawing Sheet

OXIDATIVELY STABLE RIGID AROMATIC POLYIMIDE COMPOSITIONS AND PROCESS FOR THEIR PREPARATION

BACKGROUND OF THE INVENTION

The present invention relates to rigid, aromatic polyimide compositions having improved oxidative stability and surprisingly excellent tensile properties. More particularly, the invention resides in the discovery that such rigid, aromatic polyimide compositions can be prepared by a solution imidization process.

Typically, aromatic polyimide compositions have been prepared by solution imidization as described in a U.S. Pat. No. 3,179,631 to Endrey, and U.S. Pat. No. 3,249,588 to Gall. These previous polyimide compositions, with high thermal stability and overall mechanical properties, have found wide acceptance as coatings, films and fabricated parts used in technically demanding environments such as plasma chambers, jet engines, business machines, automotive components and diverse industrial equipment.

Rigid, aromatic polyimide compositions, on the other hand, have heretofore been made by solid state imidization after precipitation of the polyamic acid intermediate as described in U.S. Pat. No. 5,162,492 to Kaku. In Kaku, the solid state imidization process was used to react 3,3'4,4'-biphenyltetracarboxylic dianhydride (BPDA) and m-phenylene diamine (MPD) to produce a rigid, aromatic polyimide composition having hydrolytic and oxidative stability. It is known, however, that rigid, aromatic polyimide compositions are typically too crystalline when they are imidized in solution, which results in very poor properties. No solution imidization process has ever been successfully used to make rigid, aromatic polyimide compositions having acceptable properties.

Despite the excellent performance characteristics of previously available polyimide compositions, effort has been directed toward further improvement of the resistance of articles made from polyimide compositions to high temperature oxidative environments, such as those found in semiconductor etch chambers and gas turbine engines. Additionally, the solution imidization process is easier and is a less expensive process for producing polyimide compositions.

SUMMARY OF THE INVENTION

The present invention resides in the discovery that rigid, aromatic polyimide compositions having high oxidative stability and excellent tensile properties can be prepared by a solution imidization process having the steps of:

a) reacting a diamine component which comprises greater than 60 mole % to about 85 mole % p-phenylene diamine (PPD) and 15 mole % to less than 40 mole % m-phenylene diamine (MPD) with at least one aromatic dianhydride component in an organic solvent to form a polyamide acid polymer solution;

b) transferring said polyamide acid polymer solution for a sufficient time to a heated solution of said solvent while heating and agitating, thereby completing the reaction to a slurry of insoluble polyimide; and c) filtering, washing, and drying said polyimide slurry to form a rigid, aromatic polyimide resin.

Another aspect of the invention provides a rigid, aromatic polyimide composition having the recurring unit

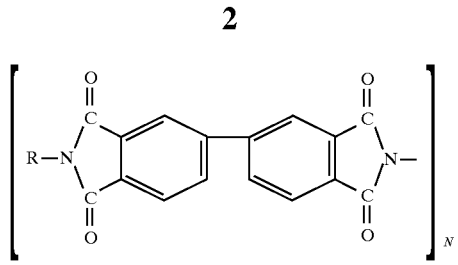

where R is greater than 60 to about 85 mole % PPD and 15 to less than 40 mole % MPD using a solution imidization process.

In a preferred embodiment, the present invention is a rigid, aromatic polyimide composition having improved oxidative stability and excellent tensile properties which is made up 3,3'4,4'-biphenyltetracarboxylic dianhydride (BPDA) as the dianhydride component and 70 mole % p-phenylene diamine and 30 mole % m-phenylene diamine as the diamine component, which is prepared by the solution imidization process.

DETAILED DESCRIPTION

Figure 1:
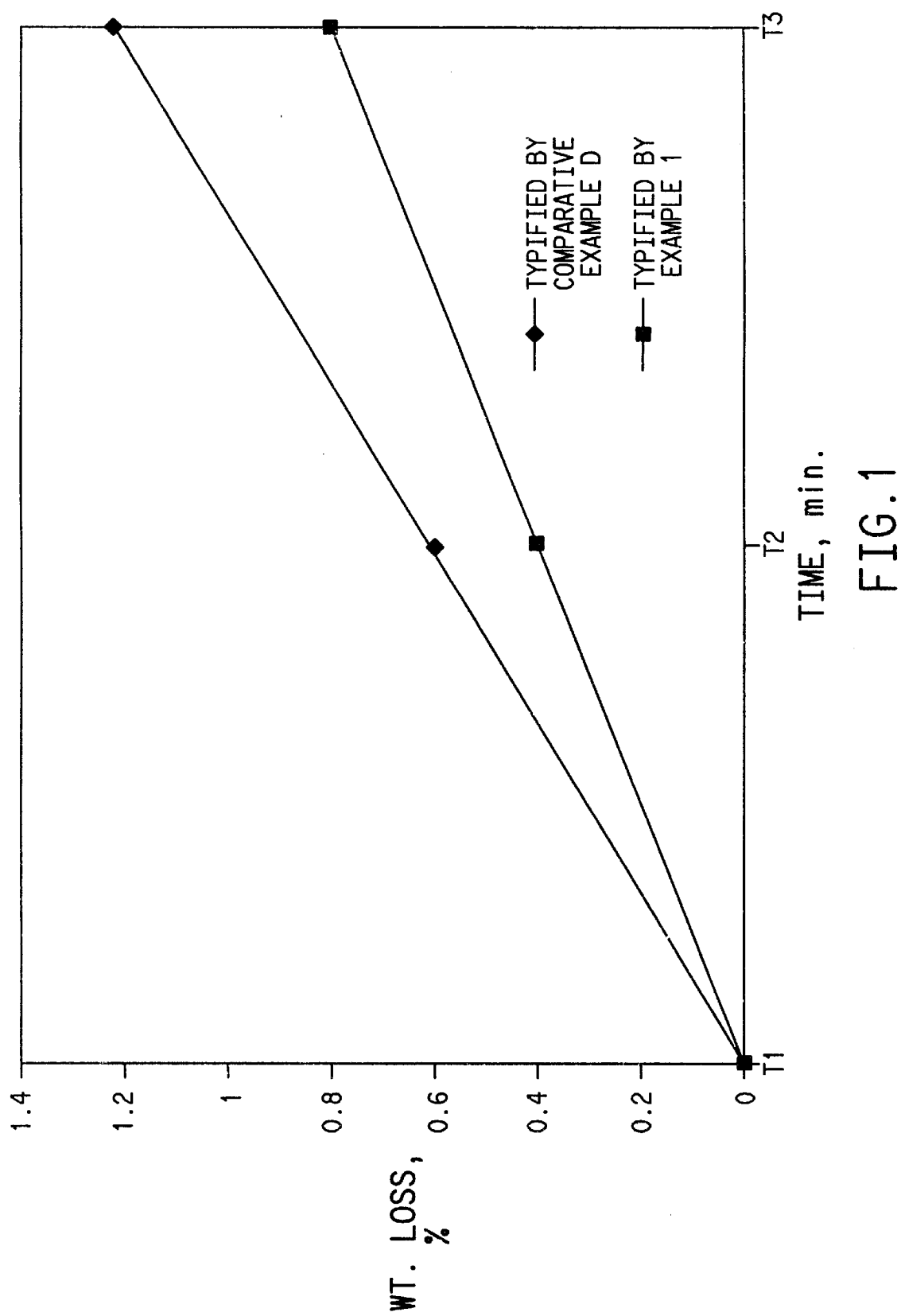
FIG. 1 is a graphical illustration of the plasma resistance as expressed by weight loss over time for Examples of the present invention versus a known polyimide composition made by the solution imidization process.

The present invention provides a rigid, aromatic polyimide composition having improved oxidative stability and excellent tensile properties which is generally prepared by reaction of a dianhydride with a diamine as described in U.S. Pat. No. 3,249,588 to Gall, see specifically Examples III and XVII. It has been found that when using such a solution imidization process, an aromatic tetracarboxylic dianhydride component can be reacted with a mixture of p-phenylene diamine (PPD) and m-phenylene diamine (MPD) as the diamine component to form a reaction solution, which is then subsequently imidized in solution and precipitated, such that the resulting polyimide composition exhibits unexpectedly improved oxidative stability and excellent tensile properties.

By the term rigid polyimide, what is meant is that there are no flexible linkages in the polyimide unit.

The aromatic tetracarboxylic dianhydride components useful in the present invention include pyromellitic dianhydride (PMDA), 3,3'4,4'-biphenyltetracarboxylic dianhydride (BPDA), and any other rigid aromatic dianhydride. Best results occur when BPDA is used as the dianhydride component.

For a preferred embodiment of the present invention, the solution imidization process is used to provide a rigid, aromatic polyimide composition having the recurring unit

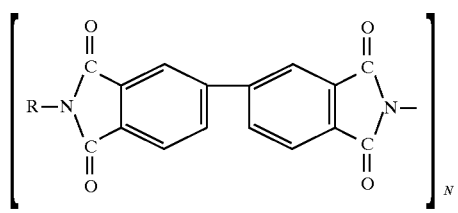

where R is greater than 60 to about 85 mole % PPD units and 15 to less than 40 mole % MPD units. Polyimide compositions having 70% PPD and 30% MPD is preferred.

In the preparation of the present polyimide compositions, the solution imidization process is utilized according to the following. The diamines (PPD and MPD) are generally first dissolved in a solvent to form the diamine component. In general, after dissolving the diamine component in the required concentration of the solvent, the dianhydride is added to the reaction solution in substantially equimolar quantities to form a polyamide acid (PAA) polymer solution. A slight molar excess of either the dianhydride or diamine component is possible. A molar excess of 0.5 to 1.0% of the diamine component has been found to provide best results. As a general rule, better tensile properties result from closer to equimolar stoichiometry but this must be balanced against the higher viscosity that occurs as the equimolar point is approached as would be known by one of ordinary skill in the art.

The resulting PAA polymer solution is transferred over a period of time to a heated solution of the solvent. The transferred PAA polymer solution is continuously heated and agitated to complete the reaction of soluble PAA to a slurry of insoluble polyimide.

The resulting polyimide slurry is washed with solvent and dried at 100° to 230° C., preferably 140° to 190° C., more preferably 180° C, to convert the polyimide slurry to a polyimide resin in the form of a powder having a high surface area. The optimum temperature of 180° C. results in greater process efficiency and better physical properties. Depending on the particle size resulting from the precipitation of polyamide acid from the reaction solution, the particles of polyimide can be further modified for example, by suitable grinding techniques, to provide a desirable particle size for handling and subsequent molding.

The solvents useful in the solution polymerization process for synthesizing the PAA polymer solution are the organic solvents whose functional groups will not react with either of the reactants (the BPDA or the diamines) to any appreciable extent. The solvent exhibits a pH of about 8 to 10, which can be measured by mixing the solvent with a small amount of water and then measuring with pH paper or probe. Such solvents include, for example, pyridine and β-picoline. Of the solvents disclosed in Gall and U.S. Pat. No. 3,179,614 to Edwards, pyridine ($K_B=1.4\times10^{-9}$) is a preferred solvent for these reactants in the polymerization reaction as well as functioning as the catalyst. For a dianhydride and a diamine to react to form a PAA polymer solution, a basic catalyst is needed. Since pyridine is a basic compound, it functions herein as both a catalyst and a solvent.

The quantity of solvent is important in obtaining a product having a high surface area. In particular, the solvent should be present in a quantity such that the concentration of the PAA polymer solution is about 1 to 15% by weight solids, preferably from about 8 to 12% by weight solids.

The surface area for a polyimide resin resulting from the polyimide composition of this invention should be at least 20 m²/g. It is preferable that the surface area be at least 75 m²/g to achieve acceptable physical properties and for ease of processability.

In the preparation of the PAA, it is essential that the molecular weight be such that the inherent viscosity (IV) of the PAA polymer solution is at least 0.2 dl/g, preferably 0.5 to 2.0 dl/g. The method for measuring and calculating IV is described below.

The polyimide composition often comprises fillers, particularly carbonaceous fillers such as graphite, to improve wear and frictional characteristics while retaining the excellent tensile and oxidative stability of the polyimides. Other fillers which can be used with the present polyimide compositions include molybdenum disulfide, kaolinite clay and polytetrafluoroethylene polymers and copolymers. Fillers can be present in quantities ranging from 0.1 to 80 wt. %. The particular filler or fillers selected, as well as the quantities used, will, of course, depend on the effect desired in the final composition, as will be evident to those skilled in the art.

These fillers are typically incorporated into the heated solvent prior to transfer of the PAA polymer solution so that the polyimide is precipitated in the presence of the filler which is thereby incorporated. The form of the fillers will depend on the function of the filler in the final products. For example, the fillers can be in particulate or fibrous form.

The polyimide composition can be molded under elevated pressures to a wide variety of configurations. It has been found to be particularly convenient to mold the polyimide composition at pressures of about from 50,000 to 100,000 psi (345 to 690 MPa) at ambient temperatures.

As stated previously, the polyimide compositions of the present invention are oxidatively stable. To test oxidative stability, tensile bars are formed as described below and then subjected to extreme temperatures for a fixed, lengthy period of time. The tensile bars are weighed both before and after testing and percent weight loss is calculated. The rigid, aromatic polyimide compositions of the present invention are considered to be oxidatively stable if the percent weight loss is less than 5%, preferably less than 3%, because such a weight loss would not compromise the integrity of the tensile bar, or more specifically, parts made from this polyimide composition.

The polyimide compositions of the present invention are characterized not only by the excellent thermal oxidative stability but by exceptional tensile properties. Both tensile strength and elongation are particularly important properties for applications as described above. As is generally known to those of ordinary skill in the art, products having low elongation tend to be brittle which leads to cracking during machining or in load bearing applications. Surprisingly, the compositions of the present invention made by the solution imidization process exhibit improved tensile strength even though elongation is low.

Turning to FIG. 1, a graph showing plasma resistance of a test sample of a rigid, aromatic polyimide composition made by the solution imidization process of the present invention, (as typified in Example 1 of the invention below,) is compared to that of a test sample of an aromatic polyimide composition prepared by this same process, (as typified in Comparative Example D below.) Test samples were subjected to an extreme environment as is generally found in semiconductor oxide etch chambers as described below, and weight loss over a period of time indicates the level of plasma resistance. The Example of the present invention is clearly more plasma resistant than the known polyimide composition.

Physical properties of the molded articles can be further improved, as previously known for polyimide compositions, by sintering. The sintering is generally carried out at elevated temperatures of about from 300° to 450° C.

The polyimide compositions of the present invention are useful in a wide variety of physical configurations, including, for example molded articles, films and fibers.

The present invention is further illustrated by the following specific Examples and Comparative Examples.

EXAMPLES

In Examples 1 through 8 below, which are illustrative of the present invention, rigid, aromatic polyimide compositions were prepared using the solution imidization process in which 3,3'4,4'-biphenyltetracarboxylic dianhydride (BPDA) was the dianhydride component, and a mixture of p-phenylene diamine (PPD) and m-phenylene diamine (MPD) was the diamine component, in the quantities as indicated and according to the procedures of Gall and Endrey, the teachings of which are incorporated herein by reference. The indicated quantity of other additives were incorporated into the pyridine solvent prior to transfer of the PAA polymer solution.

The Inherent Viscosity (IV) was measured at 30° C., at a concentration of 0.5% by weight of the PAA polymer in pyridine. To calculate the IV, the viscosity of the PAA polymer solution was measured relative to that of pyridine alone by measuring the time for equal volumes to flow through a capillary of a standard viscometer. The following equation was used to calculate IV:

$$IV = \frac{Ln\left[\frac{\text{Time of PAA Polymer Solution Flow}}{\text{Time of Solvent Flow}}\right]}{C}$$

where C is the concentration of PAA expressed in gms/100 ml of solution. As known to one of ordinary skill in the art, IV is directly related to the molecular weight of the polymer.

Surface area was measured by the standard technique known as the BET technique as described in Gall using a thermal conductivity detector wherein nitrogen is absorbed from a gas stream of nitrogen (30%) and helium (70%) at liquid nitrogen temperatures. Sample weights of the polyimide resin were in the range of 0.1–0.5g. The thermal conductivity detector was maintained at room temperature and the flow rate of gas was approximately 10 ml/min.

The resulting dried polyimide resin was fabricated into tensile bars by direct forming according to ASTM E8, "Standard Tension Test Specimen for Powdered Metal Products-Flat Unmachined Tensile Test Bar," at room temperature and 100,000 psi (690 MPa) forming pressure. The tensile bars were sintered at 405° C. for 3 hours with a nitrogen purge. Tensile strength and elongation were measured according to ASTM D638.

Oxidative stability was tested by first weighing the tensile bars, then exposing the tensile bars or parts of tensile bars to a temperature of 400° C. for a period of 25 hours at a pressure of 88 psia (0.61 MPa) in air. A final weight measurement was then taken and the percent weight loss of the tensile bars was calculated according to the following formula:

$$\% \text{ weight loss} = \frac{\text{Initial Wt.} - \text{Wt. After}}{\text{Initial Wt.}} \times 100$$

Plasma resistance, as shown in FIG. 1 was conducted on a test sample typified in Example 1 below as compared to a test sample typified in Comparative Example D below, the results of which are represented in this graph. To produce the data necessary to prepare this graph, a series of plasma exposures were conducted. The test samples were subjected to standard operating conditions in an oxygen rich plasma environment as normally found in semiconductor oxide etch chambers consisting of an etch cycle (where material is removed from a surface of a silicon wafer) and a clean cycle (removal of deposited materials which result from the processing (etch) conditions). Weight loss of the test samples were measured over a period of time, wherein each T equals a 7.5 minute time period.

Example 1

BPDA/ /MPD/70% PPD 25.856 g of p-phenylene diamine (PPD) and 11.095 g of m-phenylene diamine (MPD) along with 52 g of pyridine were dissolved in 1475 g of pyridine at 55° C. to form a diamine solution. 100.02 g of 3,3',4,4'-biphenyltetracarboxylic dianhydride (BPDA) was added together with 50 g of pyridine. The diamine solution was then reacted with the dianhydride to form a PAA polymer solution of 8% by weight solids. The PAA polymer solution was then heated at 70° C. for a period of 2 hours. The PAA polymer solution was measured to have an inherent viscosity of 0.81 dl/g (in pyridine).

Approximately 1000 ml of the PAA polymer solution was transferred for a period of 100 minutes to a 114° C. solution of 300 ml of pyridine while continuously stirring the PAA polymer solution. The solution was then heated for 4 hours at 114° C. to substantially complete the reaction of soluble PAA to insoluble polyimide. The resulting polyimide slurry was filtered and washed with five volumes of acetone. The resulting filter cake was dried for 8 hours at 180° C. and approximately 25" of mercury vacuum (0.085 MPa) under a nitrogen purge. The dried polyimide resin was ground through a 20 mesh screen in a laboratory Wiley Mill.

Tensile bars were prepared as above and found to have a specific gravity of 1.393 g/cm$^3$, a tensile strength of 22.1 Kpsi (152.4 MPa) and an elongation of 4.9%. The oxidative stability as measured by weight loss as described above was 1.28%. The surface area of the dried polyimide resin was 117. m$^2$/g.

Example 2

BPDA/ /MPD/65% PPD 15.245 g of PPD and 8.210 g of MPD along with 50 g of pyridine were dissolved in 900 g of pyridine at 55° C. to form a diamine solution. 63.504 g of BPDA was added together with 50 g of pyridine to the diamine solution to form a PAA polymer solution of 8% by weight solids. The PAA polymer solution was heated to 70° C. and maintained at that temperature for 1 hour, and was then measured to have an inherent viscosity of 0.91 dl/g (in pyridine).

The PAA polymer solution was converted to polyimide slurry, washed and dried to form a dried polyimide resin, and then ground to form tensile bars as described above in Example 1. Tensile bars were prepared as above and found to have a specific gravity of 1.403 g/cm$^3$, a tensile strength of 20.4 kpsi (140.7 MPa), and an elongation of 4.0%. The oxidative stability as measured by weight loss as described above was 2.50%. The surface area of the dried polyimide resin was 98.5 m$^2$/g.

Example 3

BPDA/ /MPD/80% PPD 18.762 g of PPD and 4.696 g of MPD along with 50 g of pyridine were dissolved in 900 g of pyridine at 55° C. to form a diamine solution. 63.504 g of BPDA was added together with 50 g of pyridine to the diamine solution to form a PAA polymer solution of 8% by weight solids. The PAA polymer solution was heated to 70° C. and maintained at that temperature for 1 hour, and was then measured to have an inherent viscosity of 0.73 dl/g (in pyridine).

The PAA polymer solution was converted to polyimide slurry, washed and dried to form a dried polyimide resin, and then ground to form tensile bars as described above in Example 1. Tensile bars were prepared as above and found to have a specific gravity of 1.377 g/cm$^3$, a tensile strength of 14.4 kpsi (99.3 MPa), and an elongation of 2.1%. The oxidative stability as measured by weight loss as described above was 1.64%. The surface area of the dried polyimide resin was 81.5 m²/g.

Example 4
BPDA/ /MPD/70% PPD

The procedure of Example 1 was repeated except that the PAA polymer solution was 10% by weight solids. Tensile bars were prepared as above and found to have a tensile strength and elongation of 19.6 Kpsi (135.1 MPa) and 4.1% respectively. The oxidative stability as measured by weight loss as described above was 1.48%. The surface area of the dried polyimide resin was 78.6 m²/g.

Example 5
BPDA/ /MPD/70% PPD

The procedure of Example 4 was repeated except that 10 g of synthetic graphite, as sold by Asbury Graphite Mills, Inc. under the tradename Synthetic Graphite 4767, was added to the pyridine solvent before transfer of the PAA polymer solution. Tensile bars were prepared as above and found to have a tensile strength and elongation of 19.6 Kpsi (135.1 MPa) and 5.0% respectively. The oxidative stability as measured by weight loss as described above was 1.05%. The surface area of the dried polyimide resin was 108.5 m²/g.

Example 6
BPDA/ /MPD/70% PPD

The procedure of Example 4 was repeated except that 39.0 g of synthetic graphite, as sold by Asbury Graphite Mills, Inc. under the tradename Synthetic Graphite 4767, was added to the pyridine before transfer of the PAA polymer solution. Tensile bars were prepared as above and found to have a tensile strength and elongation of 15.0 Kpsi (103.4 MPa) and 3.8% respectively. The weight loss was 1.24%. The surface area of the dried polyimide resin was 33.2 m²/g.

Example 7
BPDA//MPD/70% PPD 13.195 kg of PPD and 5.655 Kg of MPD along with 2.3 gal (8.7 liters) of pyridine were dissolved in 132.6 gal (501.91 liters) of pyridine at 55° C. to form a diamine solution. 51.03 kg of BPDA was added together with 2.3 gal (8.71) of pyridine. The diamine solution was then reacted with the dianhydride to form a PAA polymer solution of 12% by weight solids. The PAA polymer solution was then heated to 71° to 74° C. for a period of 1 hour. The PAA polymer solution was measured to have an inherent viscosity of 0.82 dl/g (in pyridine).

This PAA polymer solution was transferred for a period of 100 minutes to a 114° C. solution of 34.8 gal (131.71) of pyridine containing 1.99 kg of Synthetic Graphite 4767 (Asbury Graphite Mills Co.) and 0.662 kg of Polyfil DL kaolinite (as manufactured by the J. M. Huber Corporation), while continuously stirring. The PAA polymer solution was then heated for 2 hours at 114° C., followed by an additional hour of heating at 145° C., to substantially complete the reaction of soluble PAA to insoluble polyimide. The resulting polyimide slurry was filtered and washed with approximately 5 volumes of acetone. The resulting filtercake was heated to 165° C. and dried at 165° C. for 4.5 hours under a nitrogen purge and moderate vacuum. The dried polyimide resin was ground through a 24 mesh screen in a Fitz Mill.

Tensile bars were prepared as above and found to have a specific gravity of 1.425 g/cm³, a tensile strength of 19.0 Kpsi (131 MPa) and an elongation of 3.8%. The oxidative stability as measured by weight loss as described above was 1.66%. The surface area of the dried polyimide resin was 125.6 m²/g.

Example 8
BPDA//MPD/70% PPD

The procedure of Example 7 was repeated except that the amount of Synthetic Graphite 4767 (Asbury Graphite Mills Co.) was 6.36 kg. The resulting polyimide slurry was washed with 4 volumes of acetone. The resulting filter cake was dried and ground as in Example 7.

Tensile bars were prepared as above and found to have a specific gravity of 1.427 g/cm³, a tensile strength of 18.4 Kpsi (127.5 MPa) and an elongation of 3.6%. The oxidative stability as measured by weight loss as described above was 0.97%. The surface area of the dried polyimide resin was 107.6 m²/g.

Comparative Example A
BPDA/ /MPD/60% PPD

In Comparative Example A, a rigid, aromatic polyimide composition was prepared using the solution imidization process of the present invention. This composition exhibited both poor physical properties and oxidative stability than compositions of the invention. 22.159 g of PPD and 14.773 g of MPD along with 49 g of pyridine were dissolved in 1475 g of pyridine at 55° C. to form a diamine solution. 100.02 g of BPDA was added together with 50 g of pyridine to the diamine solution to form a PAA polymer solution of 8% by weight solids. The reaction was heated to 70° C. and maintained at that temperature for 2 hours, and was then measured to have inherent viscosity 0.78 dl/g (in pyridine).

The PAA polymer solution was converted to polyimide slurry, washed and dried to form a dried polyimide resin, and then ground to form tensile bars as described above in Example 1. The tensile bars were prepared as above and found to have a specific gravity of 1.363 g/cm³, a tensile strength of 16.3 Kpsi (112.4 MPa), and an elongation of 3.8%. The oxidative stability as measured by weight loss as described above was 5.93%. The surface area of the dried polyimide resin was 14.2 m²/g.

Comparative Example B
BPDA/ /PPD

In Comparative Example B, a rigid, aromatic polyimide composition was prepared using the solution imidization process. In this Example, it is clear that a combination of both MPD and PPD is required to achieve good physical properties. Using the solution imidization process of this invention, 12.33 kg of PPD was dissolved in a solvent mix of 72.9 gal (276 liters) of pyridine and 72.3 gal (274 liters) of N-methyl pyrrolidinone (NMP) at 50° C. to form a diamine solution. The diamine solution was then reacted with 33.04 kg of BPDA and with 2.3 gal (8.7 liters) of pyridine to form a PAA polymer solution of 7.5% by weight solids. The PAA polymer solution was heated to 90° C. and maintained at that temperature for 85 minutes, and was then measured to have inherent viscosity 0.84 dl/g (in 50/50 pyridine/NMP).

Approximately 1000 ml of the PAA polymer solution was transferred for a period of 250 minute to a 114° C. solution of 300 ml pyridine and 150 ml NMP, while continuously stirring the PAA polymer solution. The solution was then heated for 3 hours at 114° C. to substantially complete the reaction of soluble PAA to insoluble polyimide. The resulting polyimide slurry was filtered and washed with four volumes of acetone. The resulting filter cake was dried for 16 hours at 160° C. and approximately 25" of mercury vacuum (0.085 MPa) under a nitrogen purge. The dried resin was ground through a 20 mesh screen in a laboratory Wiley Mill.

Tensile bars were prepared as above and found to have a specific gravity of 1.399 g/cm³, a tensile strength of 7.9 Kpsi (54.4 MPa), and an elongation of 1.1%. The surface area of the dried polyimide resin was 6.0 m²/g. Since the tensile strength and surface area were so low that parts made from a composition of this Example would not be suitable in applications discussed herein, the oxidative stability was not measured.

Comparative Example C
PMDA/ODA

In Comparative Example C, an aromatic polyimide composition was prepared using the solid state imidization process according to U.S. Pat. No. 4,755,555 to Manwiller et al. The polyimide resin was prepared from 4,4'-diaminodiphenyl ether (ODA) and pyromellitic dianhydride (PMDA) further including 10% Synthetic Graphite 4767 (Asbury Graphite Mills Co.), which was incorporated into the reaction mixture prior to precipitation. The PAA polymer solution was 10% by weight solids.

Tensile bars were prepared as above and found to have an oxidative stability as measured by weight loss of 10%. For specific gravity, tensile strength, elongation and surface area, the following properties were taken from published average values based on Vespel® SP1 polyimide parts and shapes as manufactured by E. I. du Pont de Nemours and Company: tensile strength of 12.5 Kpsi (86.2 MPa), elongation of 7.5%, surface area of 60 m²/g.

According to the oxidative stability testing, Examples 1 through 8 have far lower oxidative degradation than Comparative Examples A, C and D. The unfilled polyimide compositions of Examples 1 through 4 and unfilled Comparative Examples A and B were tested for surface area. The Examples of the present invention, 1 through 4, had a much higher surface area than did Comparative Examples A and B.

The tensile strength and elongation of the polyimide compositions of Examples 1 through 8 and Comparative Examples A through D are shown in Table 1 below. The tensile strength of Examples 1 through 8 were generally higher than the Comparative Examples A through D at a comparable level of filler, while the elongation remained in a useful range.

TABLE 1

| EXAMPLES | 100 weight % of dianhydride | mole %/ type diamine | Additive weight % | PAA solids (%) | Specific Gravity (g/cm³) | Tensile Strength (Kpsi)/(MPa) | Elongation (%) | Thermal Oxidative Stability (% weight loss) | Surface Area (m²g) |
|---|---|---|---|---|---|---|---|---|---|
| EXAMPLE 1 | BPDA | 30% MPD 70% PPD | — | 8 | 1.393 | 22.1/152.4 | 4.9 | 1.28 | 117.1 |
| EXAMPLE 2 | BPDA | 35% MPD 65% PPD | — | 8 | 1.403 | 20.4/140.7 | 4.0 | 2.50 | 98.5 |
| EXAMPLE 3 | BPDA | 20% MPD 80% PPD | — | 8 | 1.377 | 14.4/99.3 | 2.1 | 1.64 | 81.5 |
| EXAMPLE 4 | BPDA | 30% MPD 70% PPD | — | 10 | 1.397 | 19.6/135.1 | 4.1 | 1.48 | 78.6 |
| EXAMPLE 5 | BPDA | 30% MPD 70% PPD | Graphite 10% | 10 | 1.447 | 19.6/135.1 | 5.0 | 1.05 | 108.5 |
| EXAMPLE 6 | BPDA | 30% MPD 70% PPD | Graphite 30% | 10 | 1.549 | 15.0/103.4 | 3.8 | 1.24 | 33.2 |
| EXAMPLE 7 | BPDA | 30% MPD 70% PPD | Graphite 3% Kaolinite 1% | 12 | 1.423 | 19.0/131.0 | 3.8 | 1.66 | 125.6 |
| EXAMPLE 8 | BPDA | 30% MPD 70% PPD | Graphite 9% Kaolinite 1% | 12 | 1.427 | 18.4/126.9 | 3.6 | 0.97 | 107.6 |
| COMPARATIVE EXAMPLE A | BPDA | 40% MPD 60% PPD | — | 8 | 1.363 | 16.3/112.4 | 3.8 | 5.93 | 14.2 |
| COMPARATIVE EXAMPLE B | BPDA | 100% PPD | — | 7.5 | 1.399 | 7.9/54.4 | 1.1 | NM | 6.0 |
| COMPARATIVE EXAMPLE C | PMDA | 100% ODA | Graphite 10% | 10 | 1.380* | 12.1/83.4* | 18.0* | 10.00 | 40* |
| COMPARATIVE EXAMPLE D | PMDA | 100% ODA | — | 14.1 | 1.365* | 12.5/86.2* | 7.5* | 6.00 | 60* |

NM—Not Measured
*Average values based on published data area, the following properties were taken from published average values based on Vespel® SP2010 polyimide parts and shapes as manufactured by E. I. du Pont de Nemours and Company: tensile strength of 12.1 Kpsi (83.4 MPa), elongation of 18%, surface area of 40 m²/g.

Comparative Example D
PMDA/ODA

In Comparative Example D, an aromatic polyimide composition was prepared from 4,4'-diaminodiphenyl ether (ODA) and pyromellitic dianhydride (PMDA) according to the solution imidization process and procedure of Example 1 except that the PAA polymer solution was 14.1% by weight solids.

Tensile bars were prepared as above and found to have an oxidative stability as measured by weight loss of 6%. For specific gravity, tensile strength, elongation and surface

What is claimed is:

1. A process for preparing a rigid, aromatic polyimide composition comprising the steps of:
   a) reacting a diamine component which comprises greater than 60 mole % to about 85 mole % p-phenylene diamine and 15 mole % to less than 40 mole % m-phenylene diamine with at least one aromatic dianhydride component in a molar ratio of 1.1 in an organic solvent to form a polyamide acid polymer solution;
   b) transferring said polyamide acid polymer solution for a sufficient time to a heated solution of said organic solvent while heating and agitating, thereby completing the reaction to a slurry of insoluble polyimide; and
   c) filtering, washing, and drying said polyimide slurry to form a rigid, aromatic polyimide resin.

2. The process of claim 1 wherein step a) further comprises reacting an excess molar amount of 0 to 1.0% of up to 1.0% of said diamine component.

3. The process of claim 1 wherein step c) further comprises drying said polyimide slurry at a temperature of from about 100° to 230° C.

4. A rigid, aromatic polyimide composition comprising:
   a) an aromatic tetracarboxylic dianhydride component; and
   b) a diamine component comprising;
      i) greater than 60 mole % to about 85 mole % p-phenylene diamine, and
      ii) 15 mole % to less than 40 mole % m-phenylene diamine;
   wherein a) and b) are present in a ratio of about 1:1.

5. The polyimide composition of claim 1 further comprising pyridine as said organic solvent.

6. A molded article made from the composition of claim 4.

7. A solid-particulate polyimide comprising the recurring unit

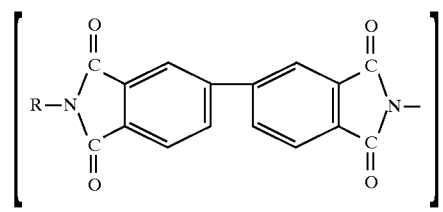

wherein R is greater than 60 mole % to about 85 mole % p-phenylene diamine and 15 mole % to less than 40 mole % m-phenylene diamine.

8. A molded article made from the composition of claim 7.

9. The polyimide composition of claim 4 wherein said dianhydride component is 3,3'4,4'-biphenyltetracarboxylic and the diamine component is 70 mole % p-phenylene diamine and 30 mole % m-phenylene diamine.

* * * * *

UNITED STATES PATENT AND TRADEMARK OFFICE
CERTIFICATE OF CORRRECTION

PATENT NO. : 5,886,129
DATED : March 23, 1999
INVENTOR(S) : Raymond Lew Decolibus It is certified that error appears in the above-identified patent and that said Letters Patent is hereby corrected as shown below:

TITLE PAGE, ADD THE FOLLOWING:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 3 | 0 | 8 | 5 | 6 9 | 05-03-94 | Hamamoto et al. | | | |
| | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | WO | 9 | 2 | 0 | 7 | 0 2 1 | 04-30-92 | PCT | | | | |
| | | EP | 0 | 1 | 9 | 9 | 3 6 4 | 10-29-86 | EPO | | | | |

Signed and Sealed this

Twenty-sixth Day of October, 1999

Attest:

Q. TODD DICKINSON

*Attesting Officer*      *Acting Commissioner of Patents and Trademarks*